United States Patent Office.

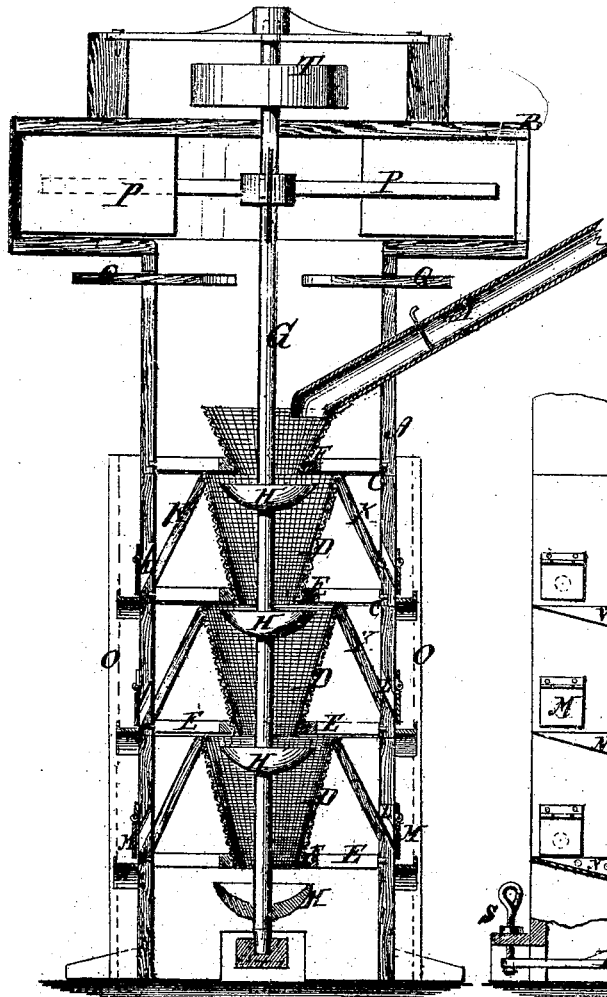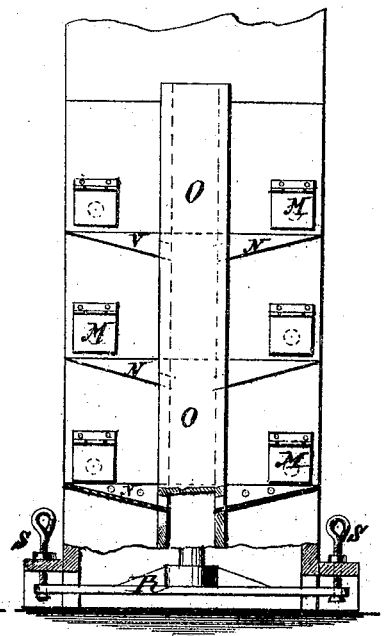

CHARLES JONES, OF DE SOTO, ILLINOIS.

Letters Patent No. 98,975, dated January 18, 1870.

IMPROVEMENT IN GRAIN-CLEANERS.

The Schedule referred to in these Letters Patent and making part of the same.

*To all whom it may concern:*

Be it known that I, CHARLES JONES, of De Soto, in the county of Jackson, and State of Illinois, have invented a new and improved Grain-Cleaner; and I do hereby declare that the following is a full, clear, and exact description thereof, which will enable others skilled in the art to make and use the same, reference being had to the accompanying drawings, forming part of this specification.

This invention relates to improvements in machines for cleaning grain, and consists in the arrangement of parts as hereinafter specified.

Figure 1 represents a sectional elevation of my improved grain-cleaner, and

Figure 2 represents a side elevation, partly sectioned.

Similar letters of reference indicate corresponding parts.

A represents a long case, which may be rectangular or cylindrical in shape, with an enlargement, B, at one end, for a fan-case. It is arranged to stand on end, with the enlargement B at the top, and is preferably made in two or more sections, joined as at C.

Within this case are arranged the screens D, shaped in the form of truncated cones inverted, and one above the other, in the same vertical axes, the small end of one being in the same horizontal plane, or nearly so, as the large end of the one next below.

These screens are supported in this way by bars E, one to each section of the case, having central rings F, forming seats for the said screens.

G is the vertical shaft. It is arranged in the vertical axis of these screens, and carries concave disks H, one below each screen.

I is a grain-spout, leading into the upper screen, and

K represents chutes leading from the space around the screens to passages L, through the case covered by doors M, opening outward, where other spouts, N O, are arranged to lead to any receptacle.

There may be two sets of these chutes, K N O, on opposite sides of the case, or more, if preferred.

In the fan-case, above the screens, fan-blowers P are attached to the said shaft, and arranged to impart a blast of air down through the screens, and the spaces at the sides of the same.

R is the bridge-tree which supports the shaft G. It is suspended by adjusting-screws S, so as to be raised or lowered readily.

The shaft G is rapidly revolved by a belt on the pulley T, or by any other suitable means, and the grain, being fed in through the spout I to the screens, will be discharged or impelled against the sides, by which the light and small matters will be separated, and the grain, falling upon the disks and being thrown off over the edges, will give up the light matters not passing through the screens to the air-blast, by which they will be carried over the top of the screens on the chutes K.

The feed may be regulated by a gate in the spout I, or by raising or lowering the shaft G and the disks, or by both combined.

The blast from the fans is regulated by the slides Q.

The concave disk below the lowest screen serves to prevent the grain from working into the cup which supports the shaft.

The shaft may also be made in sections, and joined together by one section screwing into another, or otherwise, so that the number of sections may be increased or diminished.

Having thus described my invention,

I claim as new, and desire to secure by Letters Patent—

1. The screens D, supported by rings F and bars E, the small end of one being arranged in the same horizontal plane with, and opening into the large end of the next below, and directly over the concave disks H, as shown and described.

2. The fan P, disks H, screens D, and chutes K N O, arranged, with relation to each other, and to the case A B, as set forth and shown.

3. The arrangement, with the screens, shaft, and disks, of the chutes K, passages L, and valves M, substantially as specified.

The above specification of my invention signed by me, this 16th day of August, 1869.

CHARLES JONES.

Witnesses:
W. G. SPILLER,
N. B. JONES.